July 17, 1928.

W. D. JOHNSTON

FLUE HEATER

Filed Oct. 28, 1927

1,677,636

INVENTOR
William D. Johnston
BY
ATTORNEY

Patented July 17, 1928.

1,677,636

UNITED STATES PATENT OFFICE.

WILLIAM D. JOHNSTON, OF INDEPENDENCE, MISSOURI.

FLUE HEATER.

Application filed October 28, 1927. Serial No. 229,350.

My invention relates to heating apparatus and more particularly to heat savers, the principal objects of the invention being to utilize flue gases for heating air, to circulate to rooms through a flue containing products of combustion, to heat part of the air supplied to a room by the waste gases of the principal heating means, and to improve the circulation of heated air in a hot air system.

In accomplishing these and other objects of the invention I have provided improved details of structure, the preferred forms of which are illustrated in the accompanying drawings, wherein.

Figures 1, 2:
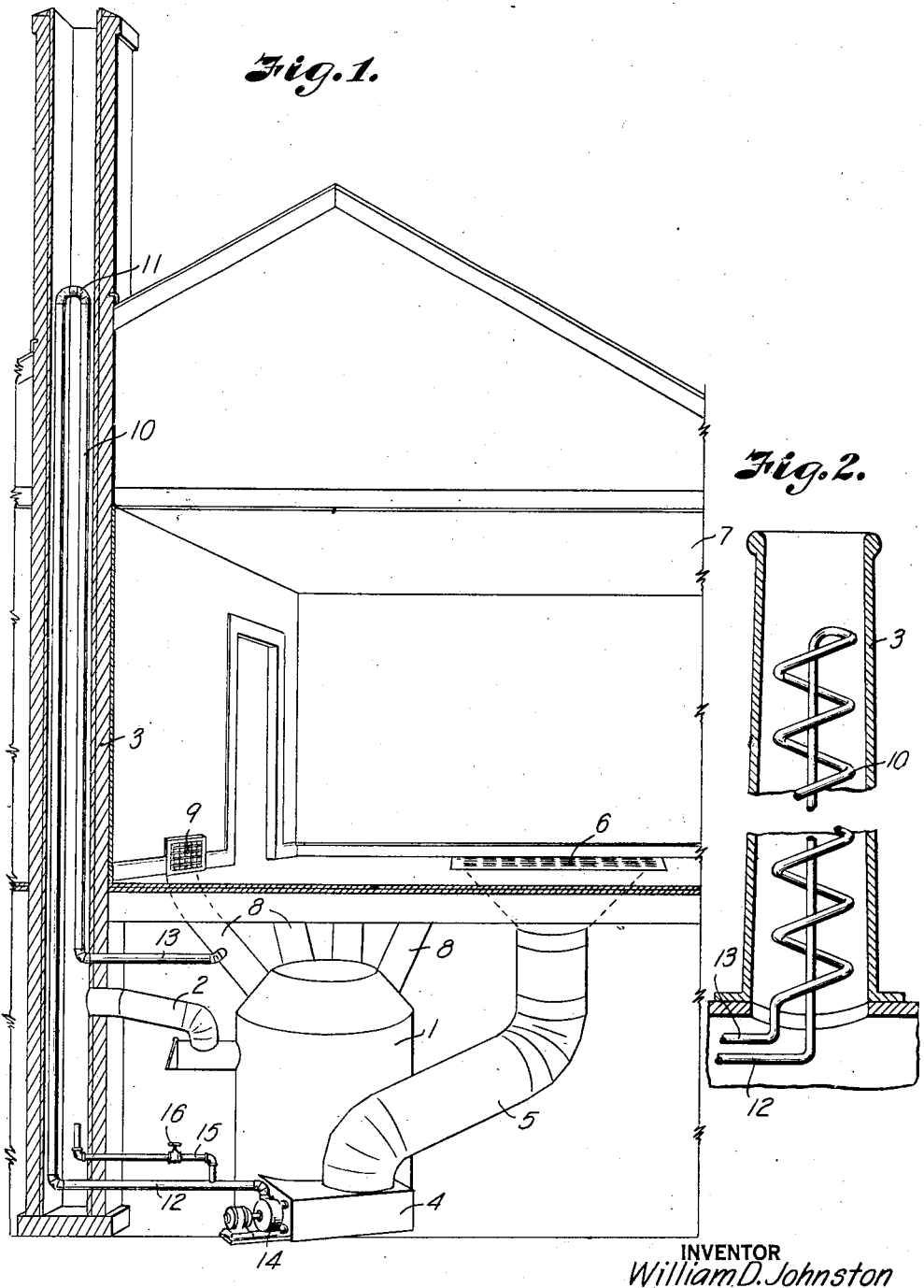
Fig. 1 is a perspective view partly diagrammatic and partly in section of a room equipped with a heating system including my invention.
Fig. 2 is a perspective view of a modified form of flue gas heated air conduit.

Referring in detail to the drawings:

1 designates a furnace having a smokepipe 2 leading to a flue or stack 3, 4 an inlet air box exterior to the furnace connected by an inlet conduit 5 with a return register 6 located in a room 7, hot air pipes such as 8 leading from the furnace to registers, such as 9, in the room.

The elements mentioned comprise an ordinary hot air heating arrangement in which air is recirculated from the rooms to the furnace and back to the rooms, it being understood that the air distributing pipes may serve several rooms while one return register may receive air from all the rooms for return to the furnace of air to be reconditioned.

I provide, for association with the illustrated heating system or the like, a supplemental air conduit 10 comprising a hairpin loop portion 11 arranged in the flue and extending upwardly to a point adjacent the top of the flue, a portion 12 extending to connection with the inlet air box, and an outlet portion 13 communicating with the hot air pipe 8. The portion 12 is preferably connected with the return air box through a fan housing 14.

The tube positioned in the flue and comprising a heat saver to receive heat from the smoke and gases injected into the flue from the furnace for heating the air passed therethrough, is provided of relatively small diameter so that it will carry only a portion of the volume of air delivered to the air box by the return conduit and also that it may occupy a relatively small space in the flue and may provide for the movement of the desired volume of flue heated air under presure to constitute and create a draft.

A draft-forcing pipe 15 preferably of smaller diameter than the conduit is connected to the inlet portion of the conduit, and extends into the flue, being provided with a valve 16 whereby a portion of air impelled by the fan may be directed into the flue to promote the draft therein.

In Fig. 2 a modification of the tubular elements of the invention is illustrated, the downwardly extending portion of which is spirally arranged to provide a substantially larger extent of the conducting tube relative to the length of the course over which it is arranged, and especially adapted for positioning in a stack serving a furnace of large capacity.

The preferred form of the device having been provided in association with a heating system including a furnace that discharges hot products of combustion into the stack or flue, heated air passes from the surface of the furnace through the hot air pipe to the room and used air passes from the room through the return conduit to the air box. The air is drawn from the air box into contact with the furnace for heating and expansion, and for rising into the hot air pipes, as in the ordinary practice.

The fan I provide draws a portion of the returned air from the air box into the tube. The air thus withdrawn from normal circulation is conducted by the tube a considerable distance within the flue and receives heat transmitted through the walls of the conduit from the products of combustion passing through the flue. The air thus heated by the flue gases is conducted by the tube to the hot air pipe mentioned and, impelled by the fan, is forced through the pipe to the room. The air thus impelled provides a means for stimulating the motion of hot air normally passing from the furnace to the room.

The fan promotes the draft through the return conduit for the return of cooled air but does not abstract a disproportionate amount of the cooled air volume since the heated furnace draws a suitable volume of cooled air to itself by the process of discharging heated air into the hot air pipes. The fan, impelling air through the tube to be heated by the flue gases and into the hot air pipe, promotes the draft of heated air in the hot air pipe.

The fan may be disconnected from the return air box and may be adapted to draw air from any suitable source to be conducted through a portion of the flue and heated in the course of its passage and discharge into a room.

What I claim and desire to secure by Letters Patent is:

1. In combination with a smoke flue and a hot air pipe of a heating system, a heating device comprising a tube connected with the hot air pipe and having a portion provided with a bend extending in the flue, and a fan adapted for impelling air through the tube to the hot air pipe.

2. In combination with a smoke flue, a hot air pipe and an air inlet of a heating system, a heating device comprising a tube connected with the air inlet and the hot air pipe and having a portion extending in the flue, and a fan for impelling a portion of air received by said inlet through the tube into the hot air pipe.

3. In a heating system comprising a furnace, a flue, hot air pipes and registers, a supplemental element comprising a tube extending in the flue and connected with one of said hot-air pipes, and means for passing air through said tube to said hot air pipes.

4. In a heating system comprising a furnace, a flue and hot air pipes, a supplemental element comprising a tube extending in the flue and connected with one of said hot air pipes, and means for passing air through said tube to said pipe.

5. In combination with a heating system comprising a heater, a return air box, hot air pipes, and a flue, a heat saver comprising a tube having a portion positioned in the flue to receive heat from products of combustion originally heating the heater, and connected with said return air box and one of said hot air pipes, and a fan adapted to draw air from said box and impel it through said tube for delivery to said air pipe.

6. In combination with a heating system comprising a heater, a return air box, hot air pipes, and a flue, a heat saver comprising a tube having a loop portion positioned in the flue to receive heat from products of combustion originally heating the heater, and connected with said return air box and one of said hot air pipes, and a fan adapted to draw air from said box and impel it through said tube for delivery to said air pipe, said heat saver being adapted to force the draft from said air box into said one of the heated air pipes.

7. In combination with a smoke flue and a hot air pipe of a furnace, a heating device comprising a tube connected with the hot air pipe and having a portion extending in the flue and an inlet portion, a pipe communicating at one end with said inlet portion and at the other end with the flue, and a fan for impelling air into said inlet for passage of a portion through the tube and a portion into the flue.

8. In combination with a heating system comprising a heater, hot air pipes, and a flue, a heat saver comprising a tube having a loop portion positioned in the flue to receive heat from products of combustion originally heating the heater, a portion connected with one of said hot air pipes, and an inlet portion, a fan adapted to force air through said inlet portion and impel it through said tube for delivery to said air pipe, and a by-pass pipe connected to the inlet portion and connected to the flue to by-pass a portion of the said fan-impelled air into the flue.

In testimony whereof I affix my signature.

WILLIAM D. JOHNSTON.